(12) United States Patent
Bauer

(10) Patent No.: US 9,221,615 B2
(45) Date of Patent: Dec. 29, 2015

(54) APPARATUS FOR COMPLETING A FORMAT SET OF PRODUCTS

(71) Applicant: Weber Maschinenbau GmbH Breidenbach, Breidenbach (DE)

(72) Inventor: Sigfrid Bauer, Gross Teetzleben (DE)

(73) Assignee: WEBER MASCHINENBAU GMBH BREIDENBACH, Breidenbach (DE)

( * ) Notice: Subject to any disclaimer, the term of this patent is extended or adjusted under 35 U.S.C. 154(b) by 0 days.

(21) Appl. No.: 14/245,899

(22) Filed: Apr. 4, 2014

(65) Prior Publication Data

US 2014/0299447 A1    Oct. 9, 2014

(30) Foreign Application Priority Data

Apr. 8, 2013 (DE) .......................... 10 2013 206 138

(51) Int. Cl.
| | |
|---|---|
| *B65G 47/52* | (2006.01) |
| *B65B 35/44* | (2006.01) |
| *B65G 37/00* | (2006.01) |
| *B26D 7/32* | (2006.01) |
| *B65B 25/06* | (2006.01) |
| *B65G 47/08* | (2006.01) |
| *B26D 7/06* | (2006.01) |

(52) U.S. Cl.
CPC ............... *B65G 37/005* (2013.01); *B26D 7/32* (2013.01); *B65B 25/06* (2013.01); *B65G 47/084* (2013.01); *B65G 47/52* (2013.01); *B26D 7/0625* (2013.01); *B26D 2210/02* (2013.01)

(58) Field of Classification Search
None
See application file for complete search history.

(56) References Cited

U.S. PATENT DOCUMENTS 4,296,590 A * 10/1981 Focke .................... B65G 47/32
198/419.1
7,205,016 B2 * 4/2007 Garwood ................. A23B 4/10
426/108

FOREIGN PATENT DOCUMENTS

| CH | 396764 A | 7/1965 |
|---|---|---|
| DE | 10143506 A1 | 5/2003 |
| EP | 2030898 A1 | 3/2009 |
| EP | 2420460 A1 | 2/2012 |

OTHER PUBLICATIONS

Extended European Search Report mailed May 23, 2014, from European Application No. 14155793.4 (7 pages).
German Search Report mailed Oct. 8, 2013, from German Application No. 102013206138.2 (11 pages).

* cited by examiner

*Primary Examiner* — Kavel Singh
(74) *Attorney, Agent, or Firm* — Kilpatrick Townsend & Stockton LLP

(57) ABSTRACT

An apparatus for completing a format set of products which are conveyed line-wise on a plurality of conveyor tracks along a conveying direction comprises a first stop conveyor and a second stop conveyor which are arranged after one another in the conveying direction and which are configured to convey products along the conveying direction on all conveyor tracks, with the first stop conveyor and the second stop conveyor furthermore being able to stop a conveyed product as required on at least one conveyor track, while a product is conveyed onward on at least one other conveyor track. A distributor conveyor is arranged between the first stop conveyor and the second stop conveyor and is configured to convey at least one product along the conveying direction, with the distributor conveyor being displaceable transversely to the conveying direction.

17 Claims, 2 Drawing Sheets

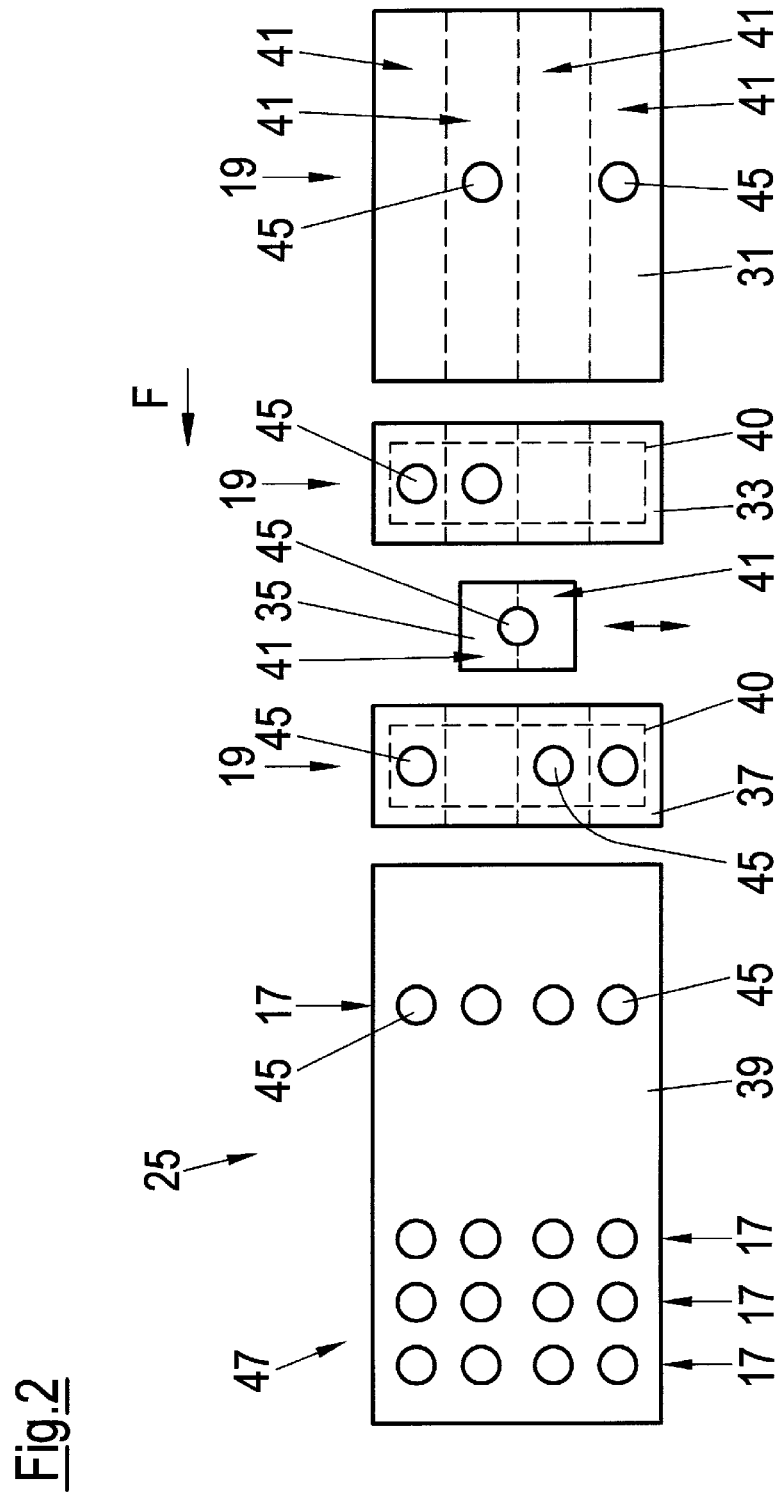

APPARATUS FOR COMPLETING A FORMAT SET OF PRODUCTS

The present invention relates to an apparatus for completing a format set of products, in particular food products, which are conveyed line-wise on a plurality of conveyor tracks along a conveying direction.

Modern high-performance slicers are capable of cutting off individual product slices simultaneously from a plurality of food products such as e.g. sausage bars or cheese loaves at a high cutting speed. Such cut-off product slices as well as product portions comprising a plurality of e.g. stacked or overlapping product slices are typically transported away from the slicer on multiple tracks along a conveyor path by means of conveying devices such as belt conveyors or strip conveyors and are supplied to a downstream processing device such as a packaging machine. The desired grouping of the products or product portions (in the following simply: products) on the conveyor path is called a format set. It can be an individual product line or a complex arrangement such as a matrix of a plurality of lines and a plurality of conveyor tracks.

In apparatus of the named kind, vacant positions in individual product lines and thus incomplete format sets can occur for various reasons. To prevent the unwanted packaging of such incomplete format sets, they can be sorted out and supplied to a correction conveyor track on which a completion of the format sets takes place. This completion can take place manually or automatically, for example by means of a robot. Both procedures are, however, associated with high costs.

It is therefore an object of the invention to allow a simple and effective completion of incomplete format sets.

The object is satisfied by an apparatus having the features of claim 1.

In accordance with the invention, an apparatus for completing a format set of products comprises a first stop conveyor and a second stop conveyor which are arranged after one another viewed in the conveying direction and which are configured to convey products along the conveying direction on all conveyor tracks, with the first stop conveyor and the second stop conveyor furthermore being able to stop a conveyed product on at least one conveyor track as required, while a product is conveyed onward on at least one other conveyor track. An apparatus in accordance with the invention furthermore comprises a distributor conveyor which is arranged, viewed in the conveying direction, between the first stop conveyor and the second stop conveyor and which is configured to convey at least one product along the conveying direction, with the distributor conveyor being displaceable transversely to the conveying direction.

Arriving products can be transferred to other conveyor tracks by means of the transversely displaceable distributor conveyor. An incomplete format set can thus be temporarily placed on the second stop conveyor—that is it can so-to-say be parked—and can be supplemented at this point by products from incomplete format sets subsequently supplied. For this purpose, the subsequent products are moved individually or in groups to the corresponding vacant positions of the parked format set by means of the distributor conveyor. In the meantime, further products of a subsequent incomplete format set are held ready on the first stop conveyor.

The invention allows an automatic completion of incomplete format sets while in principle maintaining the conveyor flow. A particular advantage of the invention is that no product store has to be provided for storing completion products since only products from succeeding incomplete format sets are used for the completion.

Further developments of the invention are set forth in the dependent claims, in the description and in the enclosed drawing.

An embodiment of the invention provides that the first stop conveyor, the second stop conveyor and/or the distributor conveyor is/are configured as undivided viewed transversely to the conveying direction. This allows a particularly simple construction and a small manufacturing effort. In this respect, "undivided" can in particular mean that the respective conveyor cannot be operated in individual track operation and in particular only has one single drive e.g. for a single through-going continuous belt or for conveyor strips which can only be driven together and which together cover the total conveyor width. It is, however, alternatively possible to configure, i.e. to divide, the respective conveyor such that it is capable of individual track operation and in particular has a plurality of drives for this purpose, in particular a separate drive for each track.

A further embodiment of the invention provides that the first stop conveyor, the second stop conveyor and/or the distributor conveyor can be driven only in the conveying direction. In other words, it is preferred that the named conveyors are not operated against the conveying direction, that is backward, during the completion process. This is also meant in the sense that a control device of the apparatus provides that the first stop conveyor, the second stop conveyor and/or the distributor conveyor is/are only operated in the forward direction, even if they could generally convey backward on the basis of the mechanical circumstances.

It is furthermore preferred that the distributor conveyor has a smaller number of conveyor tracks than the first stop conveyor and/or the second stop conveyor, with in particular the distributor conveyor having a width which corresponds to one or two conveyor tracks. It is namely not absolutely necessary for the completion of an incomplete product line to displace a subsequent product line completely transversely to the conveying direction. It is rather sufficient in many practical cases only to displace one or two products, which are located next to one another, transversely to the conveying direction. It can in particular be achieved by a bounding of the conveyor width of the distributor conveyor that the latter also does not project beyond the outside dimensions of the stop conveyors after a transverse displacement. The space requirements of the total apparatus can thus also be kept small viewed transversely to the conveying direction.

In accordance with a further embodiment of the invention, the distributor conveyor can have a length with respect to the conveying direction which is just sufficient for receiving a product and/or which is smaller than the length of the first and/or of the second stop conveyor. In particular the space requirements of the apparatus viewed in the conveying direction can hereby be kept small.

In accordance with a further embodiment of the invention, the first stop conveyor, the distributor conveyor and the second stop conveyor directly adjoin one another. It is therefore preferred for restricting the manufacturing effort that no conveyors or buffer devices disposed therebetween are provided. If required, the first stop conveyor, the distributor conveyor and the second stop conveyor can also slightly overlap. An arrangement free of overlap, however, makes possible a simplified replacement of the distributor conveyor.

The first stop conveyor and the second stop conveyor can be configured as strip conveyors which have stoppers with product lifting apparatus engaging between the strips for the stopping as required of products on individual conveyor tracks. Such stoppers allow a reliable stopping of a product while the strip conveyor continues to run.

A product detection device can also be provided to detect the number and/or the position of the products supplied to the first stop conveyor. This detection device can be arranged, for example, at an incoming conveyor preceding the first stop conveyor. All incoming format sets could e.g. be analyzed by means of a camera and an image processing device associated therewith. Incomplete format sets can be recognized fast and reliably in this manner. Furthermore, a favorable procedure in completion can be fixed in a simple manner by means of a control device on the basis of data of the detection device.

The first stop conveyor and/or the second stop conveyor can also be configured to stop a product located at any desired transverse position in order to take account of a track offset and/or different widths. This allows a particularly high flexibility in the handling of incomplete format sets, in particular when products are offset with respect to the predefined conveyor track positions and should be stopped.

The distributor conveyor is preferably displaceable at any desired transverse position. In other words, it is preferred that the distributor conveyor cannot only stop—so-to-say "latch"—at the predefined conveyor track positions, but is rather displaceable steplessly and continuously within the overall region predefined by the conveyor tracks. Products or format sets can thus also be handled which—for whatever reasons—have an offset with respect to the predefined conveyor tracks.

The invention also relates to an apparatus for conveying products, in particular food products, having at least one main conveyor path onto which the products are conveyed linewise along a conveying direction, having at least one secondary conveyor path for the completion as required of incomplete product lines and having at least one expulsion device for expelling incomplete product lines from the main conveyor path onto the secondary conveyor path.

In accordance with the invention, at least one apparatus as described above is integrated into the secondary conveyor path. A simple and fast completion of incomplete format sets can thus take place on the secondary conveyor path. The completed format sets can then be supplied to the main conveyor path again by means of a channeling in device and can e.g. be packaged.

The invention further relates to a method for completing a format set of products, in particular food products, which are conveyed line-wise on a plurality of conveyor tracks along a conveying direction.

In accordance with the invention, the following steps are provided in such a method:

conveying at least one first product of an incomplete product line on a first conveyor track from a first stop conveyor onto a distributor conveyor while stopping at least one product of the incomplete product line on the first stop conveyor on another conveyor track;

displacing the distributor conveyor transversely to the conveying direction;

conveying the first product from the displaced distributor conveyor onto a second stop conveyor; and conveying at least one further product of the incomplete product line or of a subsequent product line onto the second stop conveyor via the distributor conveyor while the first product is stopped on the second stop conveyor.

It is e.g. possible by the temporary placement or "parking" of an incomplete product line on the second stop conveyor to wait for the arrival of a further incomplete product line at the first stop conveyor and then to convey products from this further incomplete product line by transverse displacement of the distributor conveyor to the vacant positions of the incomplete product line parked on the second stop conveyor. Products of the subsequent incomplete product line not required for this purpose are in this respect parked on the first stop conveyor. It is possible in this manner to utilize the products from all incoming incomplete product lines for preparing complete format sets. A separate reservoir of products for the completion process is not required in this process.

In this respect, the invention utilizes the circumstance that the formation of incomplete product sets only occurs relatively rarely with modern food processing systems. It is therefore generally not necessary on the correction conveyor path immediately to convey on every incoming incomplete format set.

The distributor conveyor is preferably again displaced transversely to the conveying direction before the conveying of the further product on the second stop conveyor. It is possible in this manner to complete an incomplete product line having a plurality of vacant positions step by step.

A specific embodiment of the invention furthermore provides that at least one product of a first product line is conveyed from the first stop conveyor, from the distributor conveyor or from the second stop conveyor onto a downstream conveyor while simultaneously at least one product of a second subsequent product line is conveyed from a preceding conveyor onto the first stop conveyor, onto the distributor conveyor or onto the second stop conveyor. For example, a first product line can be conveyed from the first stop conveyor onto the distributor conveyor while simultaneously a second subsequent product line is conveyed from an incoming conveyor onto the first stop conveyor. Or a first product line can be conveyed from the second stop conveyor onto an outgoing conveyor while simultaneously a second subsequent product line is conveyed from the distributor conveyor onto the second stop conveyor. Such a procedure allows a particularly fast and effective completion of incomplete format sets.

The invention will be described in the following by way of example with reference to the drawing.

FIG. 2 is a simplified plan view of an apparatus in accordance with the invention for completing a format set of food products;

Figure 1:
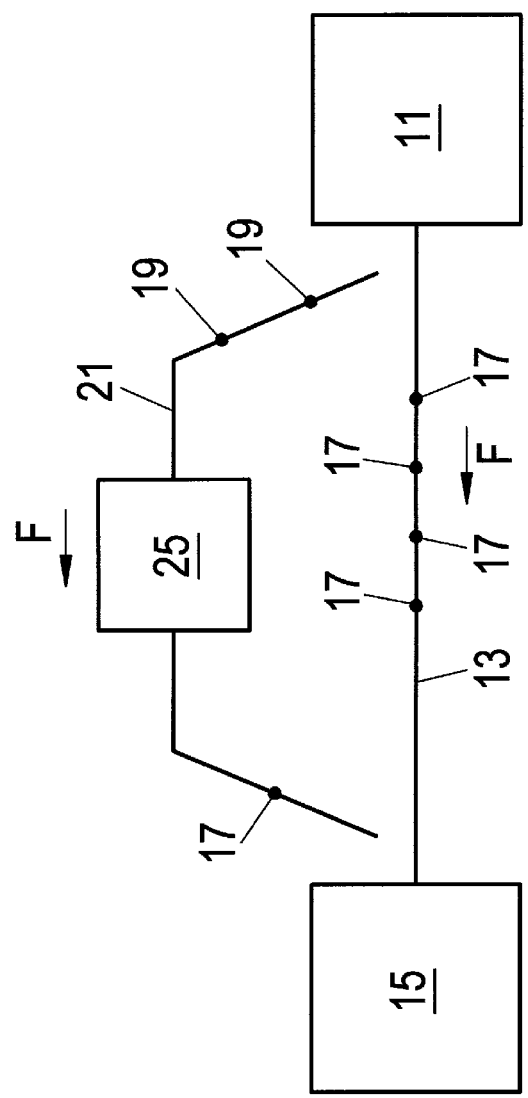
FIG. 1 shows in schematic form a food production line which comprises an apparatus in accordance with the invention for conveying food products having a main conveyor path, a secondary conveyor path and an apparatus arranged in the secondary conveyor path for completing a format set of food products.

The production line shown in FIG. 1 for preparing food products comprises a high performance slicer 11 which is configured to cut food products into slices on a plurality of tracks simultaneously. The cut off product slices—optionally stacked into product portions—are conveyed away from the high performance slicer 11 by means of suitable conveyor devices such as belt conveyors or strip conveyors in a conveying direction F along a main conveyor path 13 and are e.g. supplied to a packaging machine 15. Due to the multitrack slicing, product lines 17 shown only as points in FIG. 1 result from a plurality of product slices or portion stacks conveyed next to one another. An individual product line 17 or an arrangement of a plurality of consecutive product lines 17 in this respect forms a format set, i.e. a predefined arrangement of products or product portions to which the packaging machine has been coordinated.

For various reasons, it may occur that an incomplete product line 19 leaves the high performance slicer 11. To avoid an unwanted packaging of such an incomplete product line 19 in the packaging machine 15, all incomplete product lines 19 are conducted onto a secondary conveyor path 21 by means of an expulsion device not shown in FIG. 1, for example in the form of a rocker. On the secondary conveyor path 21, the incomplete product lines 19 are then supplied to a completing apparatus 25 which is configured for the automatic completion of the incomplete product lines 19. After the completion, the complete product lines 17 leaving the completing apparatus 25 are again supplied to the main conveyor path 13 and finally to the packaging machine 15 via an expulsion device which is likewise not shown in FIG. 1 and which can in turn be a rocker. The recognition of incomplete product lines 19 can e.g. take place directly after the high performance slicer 11 by means of a product detection device such as a camera system or scales, likewise not shown in FIG. 1. As a result, it is ensured with the production line shown that only complete product lines 17 or complete format sets are supplied to the packaging machine 15.

The operation of the completing apparatus 25 will be described in detail in the following with reference to FIG. 2. The completing apparatus 25 specifically comprises an incoming conveyor 31, a first stop conveyor 33, a distributor conveyor 35, a second stop conveyor 37 as well as an outgoing conveyor 39 which are arranged in this order directly following one another after one another viewed in the conveying direction F. All the named conveyors can be configured as belt conveyors, strip conveyors or roller conveyors. The first stop conveyor 33 and the second stop conveyor 37 are provided with stoppers 40, only shown schematically, and are therefore able to stop a conveyed individual product 45, that is a slice or a slice stack, as required on at least one conveyor track 41 while an individual product 45 is conveyed onward on at least one other conveyor track 41. As is illustrated by the double arrow, the distributor conveyor 35 can be displaced continuously, that is steplessly, transversely to the conveying direction F. The incoming conveyor 31, the first stop conveyor 33, the distributor conveyor 35, the second stop conveyor 37 and the outgoing conveyor 39 are each configured as divided viewed transversely to the conveying direction F. The named conveyors can furthermore only be driven in the conveying direction F. The stoppers 40 can, for example, be configured as product lifting apparatus gripping between the strips of a strip conveyor.

As shown, the distributor conveyor 35 has a smaller conveyor width than the first stop conveyor 33 and the second stop conveyor 37. Specifically, the distributor conveyor 35 has two conveyor tracks 41 in the embodiment shown. This is, however, not compulsory, i.e. the distributor conveyor 35 could also have only one single conveyor track 41 or more than two conveyor tracks 41. As shown, an individual product 45 can also be conveyed on the distributor conveyor 35 independently of the fixed conveyor tracks 41.

Incomplete product lines 19 arriving at the completing apparatus 25 are first conveyed from the incoming conveyor 31 to the first stop conveyor 33. A first individual product 45 of the incomplete product line 19 is then, for example, conveyed from the first stop conveyor 33 onto the distributor conveyor 35 while the remaining individual products 45 of the incomplete product line 19 are held back on the first stop conveyor 33 by means of the stopper 40. The distributor conveyor 35 is then displaced transversely to the conveying direction F so that the individual product 45 located on it is associated with another conveyor track 41. The individual product 45 is then conveyed on this other conveyor track 41 from the distributor conveyor 35 onto the second stop conveyor 37. At the same time, a further individual product 45 of the incomplete product line 19 stopped on the first stop conveyor 33 is conveyed onto the distributor conveyor 35, with the latter optionally again being displaced beforehand.

As soon as all the individual products 45 have been removed from the first stop conveyor 33, a further incomplete product line 19 is conveyed from the incoming conveyor 31 onto the first stop conveyor 33. All conveyor tracks 41 are occupied step by step with individual products 45 on the second stop conveyor 37. Subsequently, the now complete product line 17 is conveyed from the second stop conveyor 37 onto the outgoing conveyor 39 and is finally again channeled into the main conveyor track 13 (FIG. 1). If an incomplete product line 19 comprises two individual products 45 located next to one another, they can, as required, also be conveyed together onto the distributor conveyor 35 and from it onto the second stop conveyor 37.

The described procedure allows a continuous compilation of complete product lines 17 from incoming incomplete product lines 19. A separate supply of individual products 45 from a product store is not necessary.

As FIG. 2 also shows, a plurality of individual complete or completed product lines 17 can be compiled to form a matrix 47 of products, that is a multi-line format set, e.g. on the outgoing conveyor or at a point on the main conveyor path 13 (cf. FIG. 1). The invention consequently also relates to an apparatus and to a method for preparing or completing multi-line format sets as well as to an apparatus and to a method for conveying products which allows such a preparation or completion of multi-line format sets.

REFERENCE NUMERAL LIST 11 high performance slicer
13 main conveyor path
15 packaging machine
17 complete product line
19 incomplete product line
21 secondary conveyor path
25 completing apparatus
31 incoming conveyor
33 first stop conveyor
35 distributor conveyor
37 second stop conveyor
39 outgoing conveyor
40 stopper
41 conveyor track
45 individual product
47 format set, matrix
F conveying direction

The invention claimed is:

1. An apparatus for completing a format set of products, which are conveyed line-wise on a plurality of conveyor tracks along a conveying direction, the apparatus comprising:
  a first and a second stop conveyor which are arranged behind one another, viewed in the conveying direction, and are configured to convey products on all conveyor tracks along the conveying direction, wherein the first stop conveyor and the second stop conveyor are configured as strip conveyors which have stoppers with product lifting apparatus engaging between the strips for the stopping as required of products on individual conveyor tracks, wherein the first and second stop conveyors are furthermore able, as required, to stop a conveyed product on at least one conveyor track while a product is conveyed onward on at least one other conveyor track; and
  a distributor conveyor which is arranged, viewed in the conveying direction, between the first stop conveyor and the second stop conveyor and which is configured to convey at least one product along the conveying direction, wherein the distributor conveyor is displaceable transversely to the conveying direction.

2. The apparatus in accordance with claim 1, wherein the products are food products.

3. The apparatus in accordance with claim 1, wherein at least one of the first stop conveyor, the second stop conveyor and the distributor conveyor is configured as undivided transversely to the conveying direction.

4. The apparatus in accordance with claim 1, wherein at least one of the first stop conveyor, the second stop conveyor and the distributor conveyor can only be driven in the conveying direction.

5. The apparatus in accordance with claim 1, wherein the distributor conveyor has a smaller number of conveyor tracks than at least one of the first stop conveyor and the second stop conveyor.

6. The apparatus in accordance with claim 5, wherein the distributor conveyor has a width which corresponds to one or two conveyor tracks.

7. The apparatus in accordance with claim 1, wherein the distributor conveyor has a length in relation to the conveying direction which is just sufficient to receive a product and/or which is smaller than the length of the first and/or second stop conveyor.

8. The apparatus in accordance with claim 1, wherein the first stop conveyor, the distributor conveyor and the second stop conveyor directly adjoin one another.

9. The apparatus in accordance with claim 1, wherein a product detection device is provided to detect at least one of the number and the position of the products supplied to the first stop conveyor.

10. The apparatus in accordance with claim 9, wherein the product detection device comprises at least one of a camera and scales.

11. The apparatus in accordance with claim 1, wherein the first stop conveyor and/or the second stop conveyor are configured to stop a product located at any desired transverse position in order to take account of a track offset and/or different widths.

12. The apparatus in accordance with claim 1, wherein the distributor conveyor is displaceable to any desired transverse position.

13. A system for conveying products
having at least one main conveyor path on which the products are conveyed line-wise along a conveying direction;
at least one secondary conveyor path for completing incomplete product lines as required; and
at least one expulsion device for expelling incomplete product lines from the main conveyor track onto the secondary conveyor track,
wherein at least one apparatus is integrated into the secondary conveyor path, the apparatus comprising:
a first and a second stop conveyor which are arranged behind one another, viewed in the conveying direction, and are configured to convey products on all conveyor tracks along the conveying direction, wherein the first stop conveyor and the second stop conveyor are configured as strip conveyors which have stoppers with product lifting apparatus engaging between the strips for the stopping as required of products on individual conveyor tracks, wherein the first and second stop conveyors are furthermore able, as required, to stop a conveyed product on at least one conveyor track while a product is conveyed onward on at least one other conveyor track; and
a distributor conveyor which is arranged, viewed in the conveying direction, between the first stop conveyor and the second stop conveyor and which is configured to convey at least one product along the conveying direction, wherein the distributor conveyor is displaceable transversely to the conveying direction.

14. A method for completing a format set of products which are conveyed line-wise on a plurality of conveyor tracks along a conveying direction, comprising the steps:
conveying at least one first product of an incomplete product line on a first conveyer track from a first stop conveyor onto a distributor conveyor while stopping at least one product of the incomplete product line on the first stop conveyor on another conveyor track;
displacing the distributor conveyor transversely to the conveying direction;
conveying the first product from the displaced distributor conveyor onto a second stop conveyor; and
conveying at least one further product of the incomplete product line or of a subsequent product line onto the second stop conveyor via the distributor conveyor while the first product is stopped on the second stop conveyor, wherein the first stop conveyor and the second stop conveyor are configured as strip conveyors which have stoppers with product lifting apparatus engaging between the strips for the stopping as required of products on individual conveyor tracks.

15. The method in accordance with claim 14, wherein the products are conveyed line-wise by means of an apparatus, the apparatus comprising:
a first and a second stop conveyor which are arranged behind one another, viewed in the conveying direction, and are configured to convey products on all conveyor tracks along the conveying direction, wherein the first and second stop conveyors are furthermore able, as required, to stop a conveyed product on at least one conveyor track while a product is conveyed onward on at least one other conveyor track; and
a distributor conveyor which is arranged, viewed in the conveying direction, between the first stop conveyor and the second stop conveyor and which is configured to convey at least one product along the conveying direction, wherein the distributor conveyor is displaceable transversely to the conveying direction.

16. The method in accordance with claim 14, wherein the distributor conveyor is again displaced transversely to the conveying direction before the conveying of the further product onto the second stop conveyor.

17. The method in accordance with claim 14, wherein at least one product of a first product line is conveyed from the first stop conveyor, from the distributor conveyor or from the second stop conveyor onto a subsequent conveyor while at least one product is simultaneously conveyed by a preceding conveyor from the first product line or from a second subsequent product line onto the first stop conveyor, onto the distributor conveyor or onto the second stop conveyor.

* * * * *